Dec. 20, 1955  F. M. JOHNSON  2,727,254
DROPPABLE MOTORIZED EMERGENCY RESCUE CAPSULE
Filed Oct. 22, 1951  3 Sheets-Sheet 1
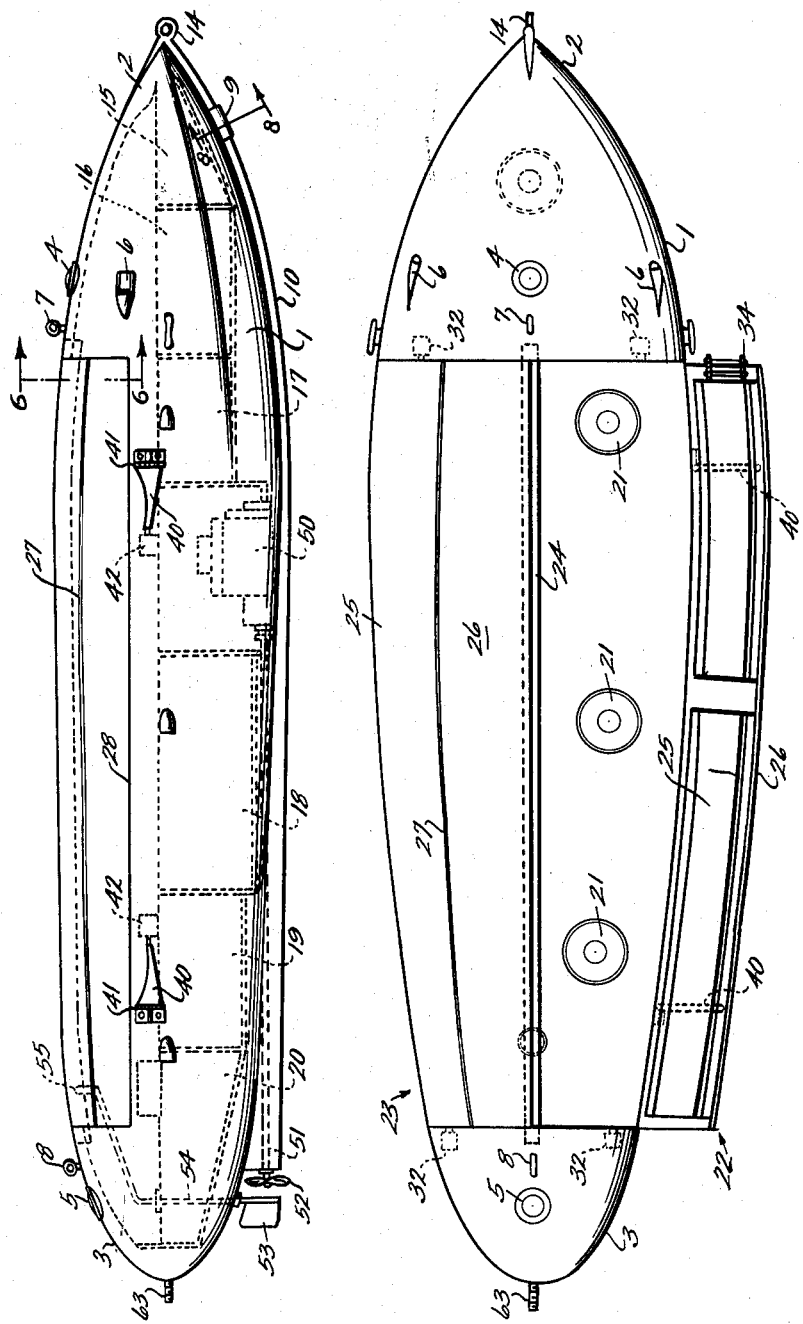
INVENTOR.
FRANCIS M. JOHNSON
BY Charles L. Burgoyne
AGENT
Wade Koontz
ATTORNEY

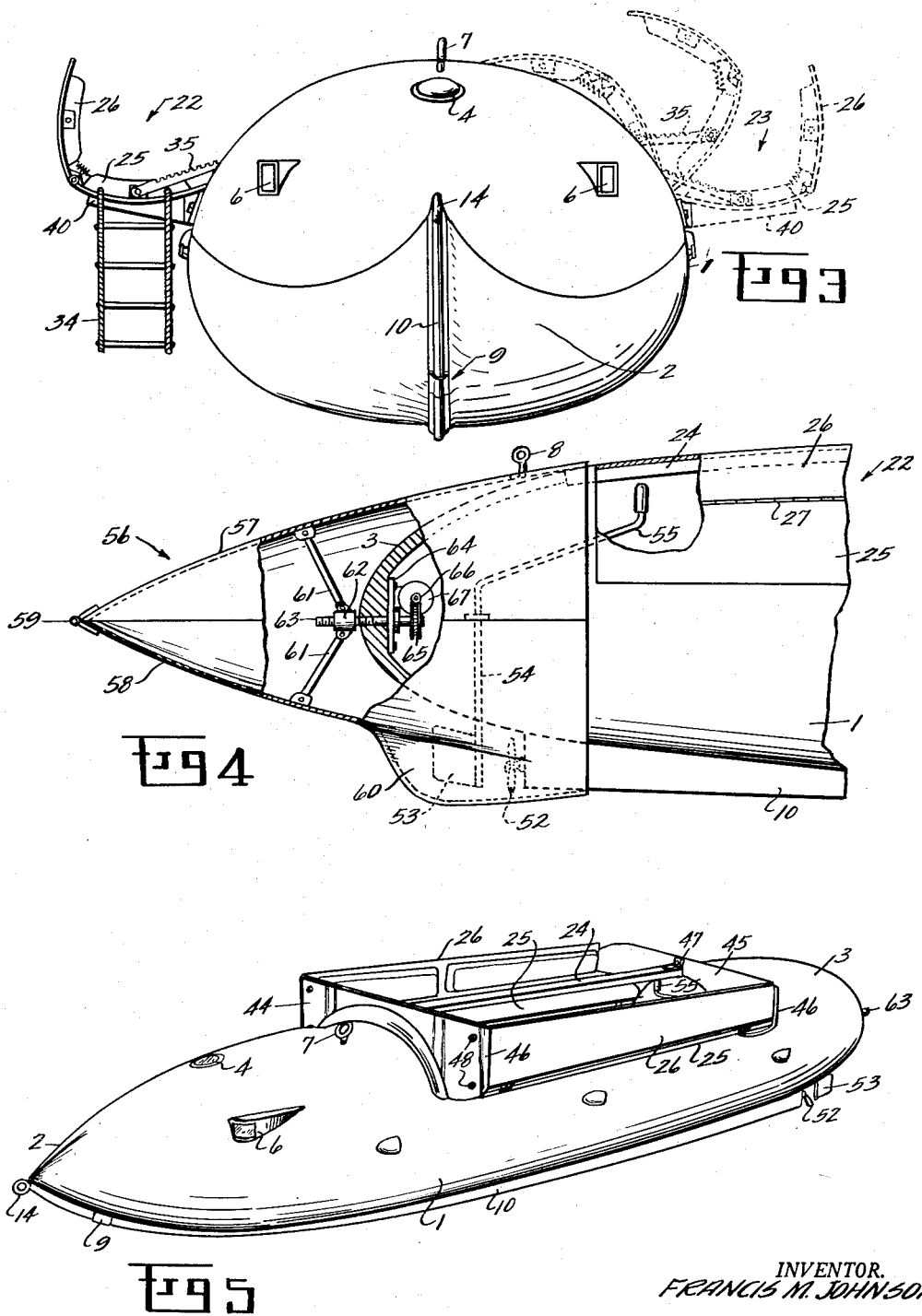

Dec. 20, 1955  F. M. JOHNSON  2,727,254
DROPPABLE MOTORIZED EMERGENCY RESCUE CAPSULE
Filed Oct. 22, 1951  3 Sheets-Sheet 3
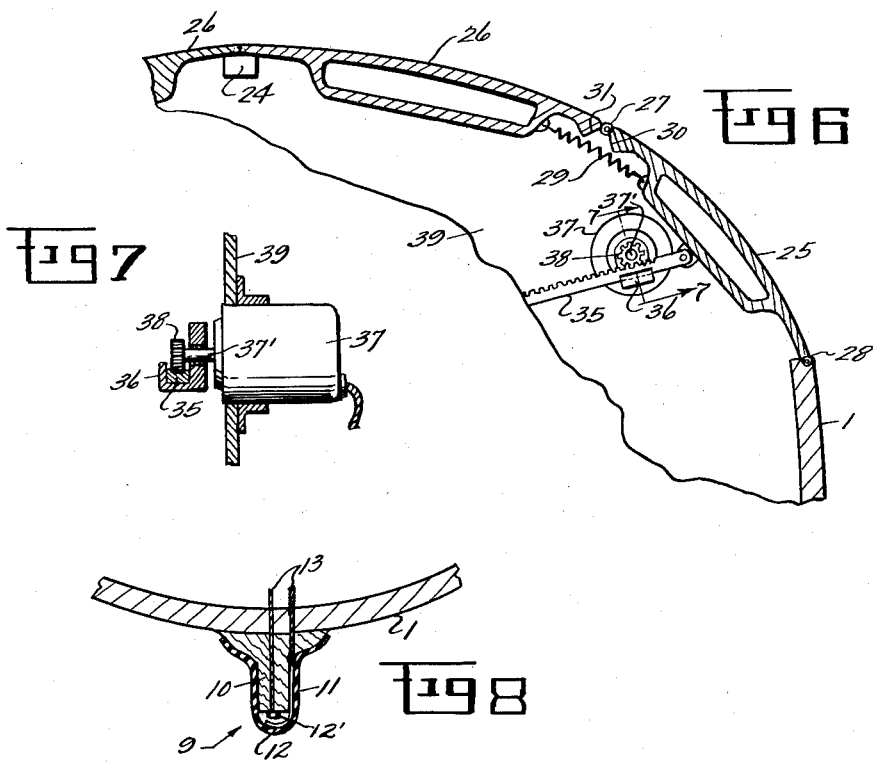
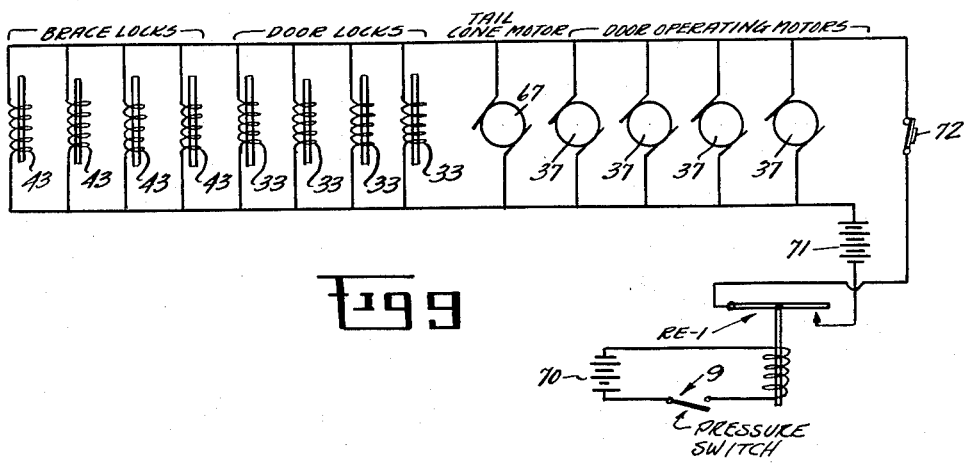
INVENTOR.
FRANCIS M. JOHNSON

United States Patent Office

2,727,254
Patented Dec. 20, 1955

2,727,254

DROPPABLE MOTORIZED EMERGENCY RESCUE CAPSULE

Francis M. Johnson, Dayton, Ohio

Application October 22, 1951, Serial No. 252,565

7 Claims. (Cl. 9—4)

(Granted under Title 35, U. S. Code (1952), sec. 266)

The invention described herein may be manufactured and used by or for the United States Government for governmental purposes without payment to me of any royalty thereon.

The present invention relates to a droppable motorized emergency rescue capsule or lifeboat.

The primary object of the invention is to provide a motorized lifeboat having hinged covers over the upper part in order to exclude water from the inside of the boat when the lifeboat is dropped from an aircraft into the sea and including power driven means inside the boat to open the covers in response to closing of one or more impact switches fixed on the outer side of the boat hull and adapted to be closed by impact with the water when the boat is dropped from an aircraft flying at low altitude.

A further object of the invention is to provide a self-propelled lifeboat having improved aerodynamic characteristics to avoid useless drag when the lifeboat is carried below an aircraft and wherein the lifeboat is provided with means to releasably retain a fairing cone over the aft end of the lifeboat and wherein power driven means is provided inside the lifeboat to release the tail cone in response to closing of one or more impact switches fixed on the outer side of the boat hull and adapted to be closed by impact with the water when the boat is dropped from an aircraft flying at low altitude.

Another object of the invention is to provide a motorized lifeboat having hinged covers over the upper part to exclude water from the boat when it is dropped from an aircraft into the sea and including means energized by an electric circuit responsive to closing of an impact switch to unlock the covers, open the covers and also release several cover braces serving to support the covers in their open positions.

The above and other objects of the invention will become apparent upon reading the following detailed description in conjunction with the accompanying drawings, in which:

Figure 1 is a side elevation view of the rescue capsule with the foldable covers closed.

Figure 2 is a top plan view of the rescue capsule with the foldable cover on one side open.

Figure 3 is a bow end view of the rescue capsule with the cover on the starboard side open and the cover on the port side shown in several positions between closed and open.

Figure 4 is a fragmentary side elevation view partly in cross section showing a streamlined removable tail or stern cone to improve the aerodynamic characteristics of the capsule.

Figure 5 is a perspective view taken from the forward end of the capsule and shows the covers on both sides open and a pair of removable end shields or transverse coaming boards.

Figure 6 is a fragmentary transverse cross section through the cover on one side of the capsule taken about on line 6—6 of Figure 1 to show a motor driven cover actuator.

Figure 7 is a cross sectional view taken about on line 7—7 of Figure 6 at the actuating point of one of door actuating rack bars.

Figure 8 is a cross section view taken through the bow stem of the capsule or lifeboat about on line 8—8 of Figure 6 and showing the pressure operated switch which is closed when the craft first strikes the water.

Figure 9 is a wiring diagram of the electrical devices operated by closing of the pressure switch.

In performing air-sea rescue missions it is desirable to provide an airborne droppable lifeboat capable of being dropped from an aircraft near a life raft or disabled aircraft, so that people who have been forced down in the sea may effect their own rescue. The same technique may of course be applied to the rescue of shipwreck survivors. Such a droppable lifeboat should have its own propulsion system and should be sufficiently water-tight that it will not sink when dropped into rough seas from an aircraft flying at low altitude. Such a lifeboat or rescue capsule should have a favorable aerodynamic shape, so that when mounted in the airstream below an aircraft fuselage it will not cause excessive aerodynamic drag.

One possible construction of a droppable lifeboat having the characteristics as stated above is shown in the drawings and will be described below. Referring to Figures 1 and 2 it will be seen that a boat hull 1 is provided which includes a sharp bow end portion 2 and a smoothly rounded stern end portion or fan-tail 3. A bow light 4 and an aft light 5 are each recessed into the smoothly rounded fore-deck and after-deck respectively. Forward running lights 6 are also provided at opposite sides of the hull. A pair of suspension rings 7 and 8 at the opposite ends of the lifeboat are used in securing the craft to the underside of an aircraft or in some cases within the bomb bay of the aircraft. When the lifeboat is to be dropped at sea the aircraft descends to a low altitude and after the securing devices are released the boat is free to gravitate to the water. When it strikes the water one or more pressure switches 9 fixed on the keel strip 10 are closed by the impact, thus closing power circuits to a multiplicity of devices adapted to place the craft in operating condition as a self-propelled lifeboat. As seen in Figure 8 the pressure switch is merely a rubber cover element 11 of U-shape in cross section enclosing a springy metallic strip 12 adapted to contact a metal stud 12' directly adjacent thereto. Wires 13 connect the metal stud and spring strip to a power circuit as shown diagrammatically in Figure 9. Various switch constructions may be substituted for the switch shown and several such switches may be used to increase the certainty of operation when the lifeboat strikes the water. Another possible switch construction is shown in Patent No. 2,562,185 granted Clarence D. Gross on July 31, 1951. A bow ring 14 attached on the pointed nose of the hull is used in towing or mooring the craft.

The torpedo-shaped hull 1 preferably includes a series of separate water-tight compartments 15 to 20. Access thereto is by way of circular hatches 21 which are secured in decking or flooring of the cockpit. Access to the cockpit itself is by way of an opening normally closed by similar foldable covers 22 and 23 which meet along the center line of a ridge beam 24 fixed at opposite ends and extending from the enclosed forward end to the enclosed aft end of the lifeboat. The covers each comprise a lower section 25 and an upper section 26 hinged together as at 27 (see Figure 6). The lower sections are each hinged at the lower edges to the boat hull, as at 28. The sections 25 and 26 are spring urged into a folded abutting relation by tension springs 29 and abutment shoulders 30 and 31 on the cover sections determine the relative open position of the cover sections with respect to each other. In order to releasably secure the lower cover sections 25 in closed position, electrically releasable door locks 32 are provided at each end of these cover sections. Since the details of such a lock form no part of the present invention, it should suffice to state that each lock includes a solenoid 33 (see Figure 9) to retract the lock bolt when a circuit to the respective solenoids is completed. The upper cover sections 26 are held in the closed position by means of the tension springs 29 as long as the lower cover sections 25 are securely closed. The respective cover sections 25 and 26 are of double walled construction and the inner wall is preferably padded or made of a resilient material for greater comfort. As will be readily appreciated, the cover sections form lengthwise extending seats for the boat occupants after the covers are open (see Figures 2, 3 and 5). A rope ladder 34 may be provided at one or both ends of each cover to assist in boarding the lifeboat.

After release of the door locks 32 the foldable covers 22 and 23 are automatically opened by motor driven devices which act only on the lower cover sections 25. In the illustrated embodiment the cover operators take the form of pivoted rack bars 35 pivoted at each end of cover sections 25 and slidable through guide brackets 36 mounted on shafts 37' of low speed servomotors 37. Each shaft 37' carries a pinion 38 meshing with the adjacent rack bar 35 (see Figures 6 and 7). The servomotors are mounted on end walls or bulkheads 39 at opposite ends of the lifeboat. The servomotors are preferably of the reversible type to facilitate resetting of the covers in closed position. In opening the foldable covers 22 and 23, the servomotor circuits are closed by means of the pressure switch 9 and the lower cover sections 25 are slowly moved toward open position. As the lower sections open up, the upper cover sections 25 move toward the lower cover sections until the shoulders 30 and 31 come into abutting relation. The companion cover sections then continue their opening movement about the hinges 28 at the lower edge of the lower cover sections. The final open position of the covers is determined by pivoted braces 40 having curved upper edges and mounted on the outside of the boat hull by means of spring hinges, as at 41. When the boat hull is completely closed the braces 40 are retained flat against the hull by electrically releasable locks 42 which include lock bolt portions engaging the free ends of the pivoted braces. The locks 42 each include a solenoid lock bolt retracting means 43 which is energized at the same time the door locks are released and the cover actuating servomotors energized. Therefore, the braces 40 are free to swing immediately into their cover supporting positions in which they project laterally from the sides of the boat hull.

In order to further support the cover sections 25 and 26 in the open positions and further complete the lifeboat for open sea operation, a pair of removable sea shields or transverse coaming boards 44 and 45 are provided. The shields are stowed in the boat when the covers are closed, but after the boat is boarded by survivors of a mishap the shields are manually installed in the positions as shown (see Figure 5). Edge flanges, as at 46, aid in supporting the cover sections by engaging the outer end surfaces of the cover sections. After the shields are set in place they may be fixed securely by any simple fasteners. For instance a bracket 47 on each shield at the center thereof may be bolted down to the ridge beam 24. Other bolts 48 may be threaded into bushings set into the opposite ends of the cover sections, these bolts passing through the shields 44 and 45 as shown.

Referring to Figure 1 it will be noted that the lifeboat includes an engine 50 which is adapted to drive a propeller shaft 51 having a propeller 52 fixed thereon, in order to propel the lifeboat. A rudder 53 just aft of the propeller is fixed on a rudder shaft 54 extending inside the boat and rigidly connected to a tiller 55.

For improving the aerodynamic characteristics of the present airborne lifeboat the stern is preferably provided with a fairing cone 56 comprising an upper half shell 57 and a lower half shell 58, the shells being pivoted together at their aft ends by a simple hinge means 59. The lower shell 58 includes a narrow pocket 60 fitting around the rudder and propeller of the boat. Pivoted on each shell is a strut 61 and the pair of struts extend into pivoted relation to a threaded sleeve 62 adapted to receive a threaded rod 63 extending inside the hull and journaled by means of a bearing plate 64 fixed inside the boat hull (see Figure 4). The rod carries a gear 65 adapted to be driven by a worm 66 on the shaft of a servomotor 67. With the tail cone 56 in secured position as shown the struts 61 act to hold the shells 57 and 58 in closed position relative to each other and also act to hold the tail cone onto the boat hull. On energization of the servomotor 67 by closing of the pressure switch 9 (see Figure 9), the screw shaft 63 is rotated in a direction to move the sleeve 62 rearwardly. This not only tends to separate the two shells 57 and 58 but also moves the tail cone rearwardly at the same time. The shaft finally becomes disengaged from the sleeve 62 and the whole tail cone is free to be removed or to fall off. This part of the lifeboat is usually considered to be expendable and is allowed to sink. However, if equipped with water tight floats the tail cone may later be recovered for subsequent use in its intended manner.

Referring now to Figure 9 the electrical system of the lifeboat will be described. The pressure switch 9 is preferably used in closing a low voltage circuit including battery 70 and the holding coil of relay RE-1. The relay is preferably one which includes a mechanical lock-in means to hold the relay closed once the circuit is closed by actuation of pressure switch 9. The contractor of relay RE-1 is adapted to close a power circuit including battery 71 and control switch 72. When this circuit is closed power is supplied to the door operating motors 37, the door lock solenoids 33, the brace lock solenoids 43 and the tail cone motor 67. This causes the doors or covers to be unlocked and the door operating motors immediately start opening the doors. The door braces 40 are also released for movement to the projecting positions. The tail cone motor is operated to cause release of the tail cone. The first survivor aboard the craft may open the power circuit by operation of the control switch 72, or this control switch may be in the form of a limit switch operated by one of the rack bars 35 as it reaches its fully extended position. Once the power circuite is open no further action of the various electrical devices will occur and the boat will be ready for open sea operation after installation of the sea shields 44 and 45 and after starting the engine 50.

The lifeboat has been described as though it were intended only for dropping from an aircraft for aiding survivors of downed aircraft and other disasters occurring at sea. However, it will be obvious that the same lifeboat may serve also as a general purpose lifeboat to be carried on large vessels and launched over the side of a vessel in any convenient manner. Even if dropped over the side in a careless or haphazard manner the boat when closed up tight will not ship water and because of the distribution of weight in the lifeboat will right itself after it reaches the water. The center of gravity is made low enough to ensure this self-righting action.

The embodiments of the invention herein shown and described are to be regarded as illustrative only and it is to be understood that the invention is susceptible of variations, modifications and changes within the scope of the appended claims.

I claim:

1. A lifeboat for dropping from a rescue aircraft into a body of water while flying at a low altitude thereover comprising a boat hull having convex fore and aft decks curving upwardly toward each other from the fore and aft ends of the hull, and formed with a longitudinally extending cockpit extending between the inner ends of the decks and the opposite side edges of the hull, a pair of hinged cockpit closure covers formed to close the cockpit between the inner ends of the decks and the side edges of the cockpit to form a contiguous aerodynamic surface with said decks and sides of the hull when in closed position with upper edges meeting above the center of the cockpit, hinge means connected between the said side edges and the lower edges of the cockpit covers for swinging said covers outwardly of the hull beyond said side edges to an open position, power operated cover actuating means for swinging said covers to said open position including electric motor means fixed relative to the hull and actuating means therefrom connected to the covers, water impact operated circuit closing switch means mounted on the lower portion of the exterior of said boat hull, and an energizing circuit connected to said motor means including said water impact operated switch means therein whereby to close the energizing circuit for actuation of the motor means to open said covers upon water impact of the impact operated switch means when the lifeboat is dropped from the low flying rescue aircraft into a body of water therebelow.

2. A lifeboat adapted for dropping from a rescue aircraft into a body of water while flying at low altitude thereover comprising, a boat hull having convex fore and aft decks over the fore and aft top portions of the hull, curving upwardly from the ends of the hull toward each other and terminating in longitudinally spaced relation above said hull, said hull having a cockpit formed therein extending longitudinally between the inner ends of the decks and the opposite side edges of the hull, two pairs of elongated contiguous cockpit closure covers having a closed position, each pair of covers being hinged together at their adjacent edges, said covers being shaped to form a closure for the cockpit having an outer convex surface substantially contiguous with the upper surfaces of said decks and the exterior of the hull at the opposite sides of cockpit when in closed position, each pair of said cockpit closure covers including hinge means between the same and the hull at said cockpit side edges for swinging the covers into contiguous relation over the center of the cockpit to close the same, and for swinging movement away from each other outwardly beyond the side edges of the cockpit into an open position, cover actuating means connected between the hull and each of said pairs of covers for swinging the same outwardly to said open position including electrically operated actuator means, energizing electrical circuit means therefor including a water impact actuated switch in said circuit for closing said circuit mounted on the lower portion of the boat hull for closing said circuit to energize said actuator means upon impact of said switch with the water when the boat is dropped from the rescue aircraft into a body of water when flying at a low altitude above said body of water.

3. A lifeboat adapted for dropping, from a rescue aircraft flying at a low altitude, into a body of water therebelow comprising a boat hull having fore and aft convex decks curving upwardly toward each other from the fore and aft ends of the hull, with their inner ends in longitudinally spaced relation on the hull, said hull having a cockpit formed therein between the inner ends of the decks and the opposite sides of the hull, complemental cockpit closure cover means extending longitudinally of the hull between the inner ends of said decks and the opposite sides of the cockpit and disposed in contiguous engaging relation over the longitudinal center of the cockpit, hinge means between the hull at the opposite sides of the cockpit and the cover, means for swinging the cover means outwardly away from each other beyond the sides of the cockpit, power actuating means operable between the hull and the cover including an electric motor means for swinging said cover means to open position, electrically releasable locking means between the hull and said cover means for locking said cover means in a closed position, an electrical energizing circuit connected for simultaneously releasing said locking means and actuating said motor means to release said cover means and swing said cover means to open position and a water impact operated switch connected in said circuit, mounted on the bottom of the hull for impact with the water as the lifeboat is dropped thereinto from the rescue aircraft flying thereover at low altitude.

4. A lifeboat for dropping from a rescue aircraft flying at a low altitude into a body of water therebelow comprising a boat hull having convex fore and aft decks curving upwardly from the fore and aft ends of the hull toward each other with their inner ends spaced apart, said hull having a cockpit therebetween extending to the opposite sides of the hull, said hull having a fan-tail aft section, propeller means and cooperating rudder means carried by the hull under the fan-tail section, a hollow tail section enclosing cone member mounted on the aft section of the boat hull to enclose said propeller, rudder, fan-tail aft section and a major portion of said rear deck and faired to the exterior of the hull at its inner end to improve the aerodynamic characteristics of the hull while carried below the aircraft to enclose and protect the propeller and rudder, releasable means for securing said cone onto said hull including electrically operable cone releasing means carried by the hull and releasably connected to the cone, a pair of cockpit closure covers shaped to form a pair of streamlined aerodynamic water excluding closure covers extending between the inner ends of said decks and curving upwardly from the opposite sides of the cockpit into contiguous mating relation over the longitudinal center of the cockpit when in closed position to exclude water from the cockpit and provide a streamlined aerodynamic operable closure for the cockpit, closure operating means for swinging said covers away from each other to an open position comprising electrical motor actuating means fixed to the hull and means operated thereby connected to the covers, an energizing circuit connected for simultaneously releasing said tail cone and operating said motor actuating means to open said doors including a water impact actuated switch connected in said circuit mounted on the lower portion of the hull for water impact circuit closing actuation thereof as the boat falls into a body of water from a rescue aircraft for releasing said cone section to expose the propeller and rudder means and open said covers to open said cockpit for rescue operation.

5. A lifeboat adapted for dropping from a rescue aircraft flying at low altitude comprising a boat hull having a fan-tail aft section and aerodynamic characteristics including high crowned fore and aft decks with their sides faired into the sides of the hull and curving upwardly from the fore and aft ends of the hull toward each other, separated at their inner ends by a cockpit formed in the hull extending between the inner ends of the decks and between the opposite sides of the hull, an engine driven propeller and rudder carried by the hull under the fan-tail section, a hollow tail enveloping cone removably mounted on the aft end of the hull enclosing the propeller, rudder and rear crowned deck to improve the aerodynamic characteristics of the boat and protect the propeller and rudder when the boat is dropped into the water, electrically operable releasable means connected between the aft end of the hull and the center of the tail enveloping cone, a pair of similar hinged together longitudinally extending high crowned cockpit closure covers hinged to each side of the hull at the opposite sides of the cockpit, each pair being shaped to close half the longitudinal space above the cockpit between the inner ends of the fore and aft decks with the outer edges thereof opposite the hinged connection to the hull meeting above the longitudinal center of the cockpit when in their closed position to form a contiguous outer surface with said decks and the opposite sides of the hull, electric power actuating means carried by the hull and connected to the covers for swinging the covers outwardly beyond the sides of the cockpit to an open position, electrically releasable locking means between the covers and the hull for releasably locking the covers in closed position, an energizing circuit connected to the electric power cover actuating means and the electrically operable release means for the tail enveloping cone section, and said electrically operable release means for the covers for simultaneous actuation thereof including a water impact actuated switch device connected in said energizing circuit, fixed to the lower portion of the hull for closing said circuit upon impact with the water when the boat is dropped thereinto from an aircraft flying at a low altitude thereover.

6. A lifeboat adapted for general application in sea rescue work comprising a boat hull having highly crowned fore and aft decks curving upwardly from the fore and aft ends of the hull toward each other with their inner ends spaced apart longitudinally of the hull, said hull having a cockpit formed therein extending longitudinally of the hull between the inner ends of the decks and laterally between the opposite sides of the hull, a pair of elongated convex cockpit covers extending longitudinally between the inner ends of the said decks hinged along their lower edges to the hull at the opposite sides of the cockpit and curving upwardly toward each other from said hinged connections with their upper edges meeting above the longitudinal center of the cockpit to form hinged closures therefor with their outer surfaces contiguous with the outer surface of the hull and the inner ends of the surfaces of the decks when in closed position, said cockpit covers being swingable outwardly of the hull to open said cockpit, each of said covers comprising a pair of elongated side-by-side upper and lower curved cover panels, hinge means between the panels including movement limiting stop means between the hinged-together panels for limiting the swinging of the upper panel of each cover upwardly when the lower panel of each pair is swung outwardly of the hull and downwardly to a horizontal position, whereby the upper panels extend upwardly from the outer edges of the lower panels with the lower panels disposed horizontally to provide horizontal supporting means extending longitudinally of the hull at opposite sides of the cockpit, with the upper panels forming vertical sideboards extending longitudinally of the hull between the ends of the cockpit along the outer edges of the horizontally disposed panels, removable transverse combing boards extending across the fore and aft ends of the cockpit above said decks with their outer ends projecting beyond the sides of the hull and connected to the horizontally and vertically disposed panels, when the covers are in their open positions to hold said panels in said open positions, power means on the hull connected to the covers for opening movement thereof, and water impact actuated means fixed on the bottom of the lifeboat for impact with the water as the boat is dropped therein connected to said power means for actuating the power means to open said covers.

7. A lifeboat of the class described comprising a hull having fore and aft decks extending toward each other from the fore and aft ends of the hull with their inner ends spaced apart longitudinally of the hull, said hull having a cockpit formed therein extending between the said inner ends of the deck and transversely of the hull to the opposite sides thereof, a pair of cockpit covers hinged to the hull at each side of the cockpit extending upwardly and inwardly over the cockpit toward each other, between the said inner ends of the decks to close the cockpit and swingable laterally out of said cockpit to substantially horizontal positions at the opposite sides of the cockpit, electrical power actuating means connected between the hull and the covers operable to swing said covers to said horizontal positions, electrically operable cover release locking means between the hull and the covers for retaining the covers in cockpit closing position, propelling and steering means carried by the hull under the aft end of the hull, a tail cone member removably fixed over the aft end of the hull and said aft deck enclosing said propelling and steering means, electrically releasable connecting and release means connected between said tail cone member and the hull for releasably securing said tail cone member on the hull, an electrical energizing circuit connected to said electrical power actuating means, said electrically operable cover release locking means, and said electrically releasable connecting and release means for simultaneously releasing said covers and moving the covers to open position and releasing said tail cone, and a water impact actuated switch device carried by the bottom of the hull for actuating impact thereof with a body of water when the boat is dropped from a low flying aircraft into the body of water closing said electrical energizing circuit.

References Cited in the file of this patent

UNITED STATES PATENTS

| Number | Name | Date |
|---|---|---|
| 19,977 | Ball | Apr. 20, 1858 |
| 31,562 | Scholl | Feb. 20, 1861 |
| 438,917 | Goff | Oct. 21, 1890 |
| 844,372 | Lehnert | Feb. 19, 1907 |
| 858,854 | Broch | July 2, 1907 |
| 1,100,457 | Szentpali et al. | June 16, 1914 |
| 1,295,893 | Hartz | Mar. 4, 1919 |
| 1,363,166 | Pascales | Dec. 21, 1920 |
| 1,672,163 | Krammer | June 5, 1928 |
| 1,832,046 | Olson | Nov. 17, 1931 |
| 2,075,042 | Knerr | Mar. 30, 1937 |
| 2,405,990 | Beechlyn | Aug. 20, 1946 |
| 2,427,772 | Farish | Sept. 23, 1947 |
| 2,479,713 | Beach | Aug. 23, 1949 |
| 2,510,843 | Townshend | June 6, 1950 |
| 2,583,929 | Clark | Jan. 29, 1952 |

FOREIGN PATENTS

| Number | Country | Date |
|---|---|---|
| 13,859 | Great Britain | June 16, 1906 |